UNITED STATES PATENT OFFICE.

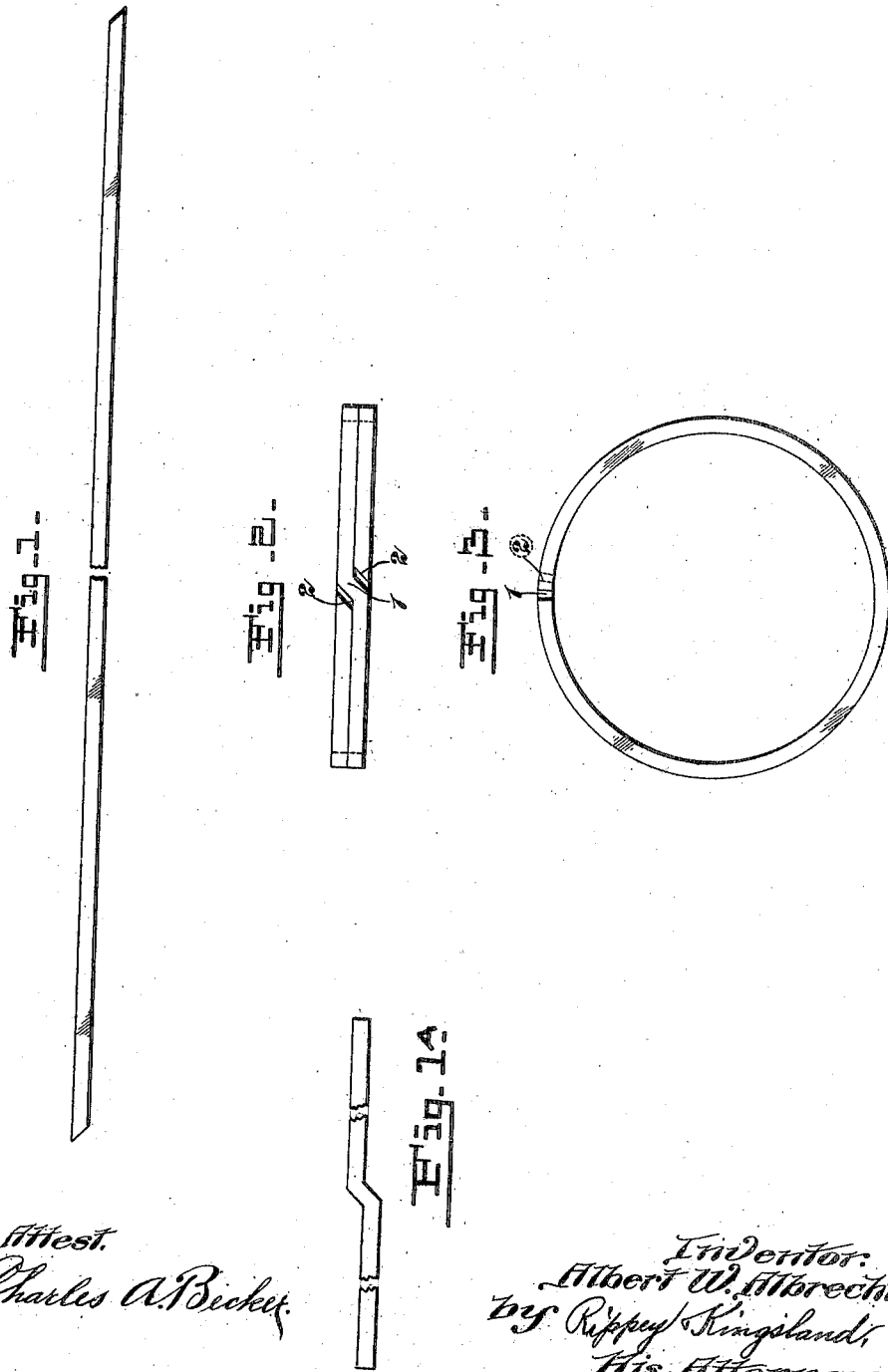

ALBERT W. ALBRECHT, OF ST. LOUIS, MISSOURI.

PROCESS OF MANUFACTURING PISTON-RINGS.

1,315,451.　　　　Specification of Letters Patent.　　Patented Sept. 9, 1919.

Application filed April 9, 1918. Serial No. 227,417.

*To all whom it may concern:*

Be it known that I, ALBERT W. ALBRECHT, a citizen of the United States, residing at the city of St. Louis and State of Missouri, have invented a new and useful Process of Manufacturing Piston-Rings, of which the following is a specification.

This invention relates to the art of manufacturing piston rings.

An object of the invention is to provide a new and improved process of forming a piston ring by subjecting a bar to pressure by which the bar is formed into a ring having overlapping portions connected by an integral bent portion and by which the overlapping portions are caused to press against each other by the resiliency of the material.

Other objects will appear from the following description, reference being made to the drawing, in which—

Figure 1 is a broken view of the bar from which the piston ring is made.

Fig. 1ª is a view illustrating the bar offset prior to being rolled into the form of a ring.

Fig. 2 is a view looking toward the periphery of the finished ring.

Fig. 3 is a side elevation of the finished ring.

In Fig. 1 is illustrated a bar which in its finished form is preferably one-half the width of the finished ring. The bar illustrated is subjected to pressure by which it is rolled to form a ring having overlapping portions extending preferably nearly the entire circumference of the ring. At the same time that the bar is being rolled into the form of a ring it is subjected to lateral pressure midway between its ends in opposite directions so that a bent portion 1 is formed, thus offsetting one coil or helix of the ring from the other coil or helix and forming the ring so that the two opposite side edges are parallel with each other throughout and are at all points at right angles to the axis of the ring. The bend 1 is preferably oblique, as shown in Fig. 2, so that the circumferential length of the bar when formed into the finished ring is only slightly less than the extended length of the bar before the ring is formed.

The bar is coiled into a ring of a diameter slightly larger than the diameter of the cylinder for which it is intended, so that the ring may be compressed into the cylinder, and to permit such compression the ends 2 are spaced from the bent connecting portion 1 thus leaving room for the movement of the end portions when being compressed into the cylinder.

By subjecting the bar to proper pressure while being coiled into the ring no finishing treatment is necessary since the pressure will produce the desired smooth surfaces on the ring and will prevent any portion of the ring or bar from being excessively strained in the course of manufacture. However, if preferred, the ring may be ground or finished after being formed, and I do not restrict myself to a procedure in which the surfaces are finished by pressure.

By the use of pressure in the course of manufacture the overlapping portions of the ring are caused to press closely against each other in the finished ring and this result is effected without resort to treatment after the bar has been coiled into annular form.

It will be understood, of course, that the offset 1 may be formed before the bar is coiled into the annular form, or that the offset may be formed concurrently with the formation of the annulus. In this particular I do not confine myself to any specific order of procedure, though it is preferred that the offset bend be formed concurrently with the formation of the ring.

I claim:

1. The process of forming a piston ring having overlapping portions, which consists in rolling an elongated bar into the form of a ring having overlapping portions and simultaneously bending the bar so that the overlapping portions press against each other sidewise.

2. The process of forming a piston ring, which consists in bending a bar so that one edge of one portion thereof is in alinement with the opposite edge of the other portion thereof, and simultaneously rolling the bar to provide overlapping portions.

3. The process of forming a piston ring having overlapping end portions, which comprises bending a long bar obliquely toward one side to place one edge of one portion thereof in alinement with the opposite edge of the other portion thereof, and rolling the bar to form a ring having overlapping end portions pressing together sidewise.

ALBERT W. ALBRECHT.